United States Patent
Shem-Ur et al.

(10) Patent No.: US 6,425,523 B1
(45) Date of Patent: Jul. 30, 2002

(54) METHOD FOR PREVENTING UNAUTHORIZED USE OF CREDIT CARDS IN REMOTE PAYMENTS AND AN OPTIONAL SUPPLEMENTAL-CODE CARD FOR USE THEREIN

(76) Inventors: Jonathan Shem-Ur, Rotshild Blvd. 108, 65271 Tel-Aviv; Anat Wolfson, Uruguay St. 14, 96702 Jerusalem; Shaul Bar-Lev, Gilaad St. 11, 51515 Ramat-Gan; Roni Sivan, Paamoni St. 10, 62918 Tel-Aviv; Ehud Kaahtan, Somolanski St. 8a, 34368 Haifa, all of (IL)

(*) Notice: Subject to any disclaimer, the term of this patent is extended or adjusted under 35 U.S.C. 154(b) by 0 days.

(21) Appl. No.: 09/762,658
(22) PCT Filed: Aug. 17, 1999
(86) PCT No.: PCT/IL99/00443
§ 371 (c)(1), (2), (4) Date: Apr. 30, 2001
(87) PCT Pub. No.: WO00/10140
PCT Pub. Date: Feb. 24, 2000

(30) Foreign Application Priority Data

Aug. 17, 1998 (IL) ................................................ 125826

(51) Int. Cl.⁷ ................................................. G06K 5/00
(52) U.S. Cl. ....................... 235/380; 235/379; 235/380; 235/382
(58) Field of Search ................................. 235/380, 379, 235/382; 705/64, 72, 75, 77, 39, 41

(56) References Cited

U.S. PATENT DOCUMENTS

| | | | | |
|---|---|---|---|---|
| 3,996,450 A | * | 12/1976 | Kerkhoff | 235/61.7 B |
| 4,884,212 A | * | 11/1989 | Stutsman | 364/479 |
| 4,958,066 A | * | 9/1990 | Hedgcoth | 235/487 |
| 5,163,098 A | * | 11/1992 | Dahbura | 380/24 |
| 5,365,046 A | * | 11/1994 | Haymann | 235/380 |
| 5,501,491 A | * | 3/1996 | Thompson | 283/70 |
| 5,673,309 A | * | 9/1997 | Woynoski et al. | 235/380 X |
| 5,988,509 A | * | 11/1999 | Taskett | 235/380 X |
| 6,134,309 A | * | 12/2000 | Carson | 379/144 |
| 6,163,771 A | * | 12/2000 | Walker et al. | 705/18 |
| 6,199,757 B1 | * | 3/2001 | Kubert | 235/380 |
| 6,222,915 B1 | * | 4/2001 | Mueller et al. | 379/144 |

FOREIGN PATENT DOCUMENTS

JP 02000163472 A * 6/2000

* cited by examiner

Primary Examiner—Karl D. Frech
Assistant Examiner—Daniel Walsh
(74) Attorney, Agent, or Firm—Mayer, Brown, Rowe & Maw

(57) ABSTRACT

A method for preventing unauthorized use of credit cards in remote payments and a supplemental-code card for therein is disclosed. A unique code list is provided by the credit company to the credit card owner for use with the credit card. The codes are distributed in a variety of possible ways, including through A.T.M. machines, stores, e-mail or faxes. A copy of each code list is associated at the credit card company with the owner of the credit card. Each code is only for a single use. For every remote payment, the credit card owner transmits one of the codes to the creditor, along with conventional credit card data. The credit card company verifies the transmitted information and accepts or rejects the transaction. The codes may be provided on a supplemental-code card with some mechanism to ensure that each code is used only once.

15 Claims, 2 Drawing Sheets

METHOD FOR PREVENTING UNAUTHORIZED USE OF CREDIT CARDS IN REMOTE PAYMENTS AND AN OPTIONAL SUPPLEMENTAL-CODE CARD FOR USE THEREIN

This application is made pursuant to 35 U.S.C. §371 of international application number PCT/IL99/00443, filed Aug. 17, 1999, with a priority date of Aug. 17, 1998.

FIELD OF THE INVENTION

The present invention generally relates to a method for preventing unauthorized use of credit cards in remote payments, and an optional supplemental-code card for use in said method. More specifically, according to the method of the present invention each remote payment is secured by a unique code (for only one time use) which is known only to the credit card owner and to the credit company. According to one preferred embodiment of the present invention, lists of the unique codes are supplied to the credit card owners through automatic-teller machines (hereinafter called also A.T.M). According to another preferred embodiment, the unique codes are supplied to the credit card owners printed on supplemental-code cards, which supply lists of codes confidentially and help the credit card owners to find out the valid code for each particular remote payment. According to another preferred embodiment, the unique codes are supplied to the credit card owners by any electronic media such as Internet, e-mail, etc.

BACKGROUND OF THE INVENTION

Remote payments by credit cards are constantly growing in importance in the world economy. In conventional credit card remote payments, a credit account is charged according to instructions and credit card details given by the customer, without checking the physical presence of the card in the customer hand. Many people hesitate to use a credit card, because its details can be reached and exploited by unauthorized users. The credit card companies have no effective way to prevent such illegal use of credit cards by unauthorized users.

The purpose of the present invention is to provide a facile and simple method for totally secure remote payments, without changing the conventional credit card held by the user.

The method according to the present invention is for distinguishing between authorized and unauthorized payments, and an optional supplemental-code card can be used in said method together with the conventional credit card. (Another advantage in using the method of the present invention is the avoidance of mistaken payments, such as double charging).

Such protection will encourage the use of credit cards in remote payments, while reducing the losses and the accompanying expenses caused by unauthorized and illegal use.

The method according to the present invention and the optional supplemental-code card can be used also for regular direct credit card payments (i.e. involving presenting the physical credit card by its owner to the creditor), all according to the economic policy of the credit company.

The use of the method according to the present invention will also release the existing psychological inhibitions in working with credit cards, thus increasing their request and usage.

In the context of the present invention:

The term "remote" relates to a payment performed through communication between a credit card owner and a remote creditor, made by any known physical way such as electrical wires, radio, optic fiber, and through any acceptable media such as: phone, fax machine, mail, interactive television or Internet.

The term "payments" relates not only to payments, but to any remote activity which is involved with a transmission of valid credit card data, and makes use (or suited to make use) of the protection method of the present invention.

The term "remote payment" relates to any payment by credit card, using the card data without the presence of the physical card at the physical site of the merchant.

The term "code" relates to any combination of digits or letters.

The term "credit company" relates to any financial or commercial entity supplying remote payments services.

The term "credit card" relates not only to a concrete physical card but (and especially) to the constant data of a credit account and its owner, which is regularly used to perform conventional remote payments. However, it has to be noted that according to the present invention (and differently from conventional credit card payments), the constant data of a credit card do not have to include a constant identification number, and all the payments can be executed using only the single use codes, together with any constant data predetermined by the credit company as a precondition for accessing the registered code list copy of the specific credit card owner, in the credit company office.

SUMMARY OF THE INVENTION

The present invention relates to a method for preventing unauthorized use of credit cards in remote payments comprising the steps of:

(a) providing by a credit company a plurality of secret code lists for use with a plurality of credit cards, wherein each list is provided to the use of a single owner of at least one credit card, and each code is for only a single use (preferably, the secret codes are generated randomly by an appropriate computer program, as known in the art), and wherein a copy of the code content of each list is registered (preferably stored in a credit computer) in an office of the credit company on a name of its authorized user (hereinafter called "credit card owner");

(b) transmitting one code from said list to a creditor by a credit card owner for every separate remote payment, together with any required conventional data of the credit card,;

(c) verifying the said single code together with the other conventional credit card data through a dialogue (by either voice, interactive television, by computer, Internet, fax machine, mail or e-mail) between the creditor and the credit company, and accepting or rejecting the payment, according to the verification result. The said dialogue can be done either between humans, between a human and a machine or automatically between machines without the involvement of humans; and (d) invalidating the single code used for an accepted payment, from the registered code list copy in the credit company office.

According to one preferred embodiment of the invention, the code list is supplied to the credit card owners through the known existing automatic teller machines (A.T.M.). The machine is programmed for producing lists of random codes (or receiving them on-line from the computer of the credit company), printing them on a voucher for the user, and transmitting them to the credit computer of the credit company for a registration on the name of its authorized user, wherein all said procedure is executed subsequently to the detection of a physical valid automatic-teller card inserted by a user into the machine, and only after typing-on its associate secret code.

According to another preferred embodiment the automatic teller machine (A.T.M.). is programmed for offering the user a selection of customer options, such as: determining which of the credit card activities will require a supplemental-code; determining the amount of codes in the generated code list; etc.

Actually, the present invention may be thought of as providing an advanced credit card type, having a variable card number, varying for every single use of the card. This variable card-number is a combination of the conventional fixed card-number and the single use code.

In another preferred embodiment the present invention provides a supplemental-code card (hereinafter called also "code card") for preventing unauthorized use of credit cards according to the said method, wherein the code card contains a list of codes for use in said method. Preferably, each code is covered by a removable layer of opaque material, for removal by the credit card owner according to a predetermined uncovering progression, prior to performing each remote payment.

The covering material may be a removable sticker (preferably having a free end for facile pulling out), or a scratchable printing paint, or a combination thereof. In the combination, the sticker is covered with a layer of scratchable printing paint such that once it was removed it is permanently damaged, thus a double use or glimpsing the code by frauds is prevented. This combination integrates the advantage of a sticker (i.e. its facile removal) and the advantage of the scratchable paint (i.e. better confidence).

It has to be noted that the method of the present invention does not rely on any physical code card, and the code list may be supplied to the users through automatic-teller machines (A.T.M.)., through an electronic wallet, through phone by voice, through a mailed letter, or through electrical means such as by facsimile machine, by the Internet, by e-mail or by any other acceptable distribution way.

According to the present invention, the code may be of one character/digit or more (or a combination thereof), according to the required protection level and to other considerations of design.

In terms of credit card security, a 4 digit code may be considered as unbreakable, however there is no prevention to expand it to more than 4 digits, or to use letters additionally to the digit decade.

The number of codes included in one card is a matter of design. According to the present invention a card may include from one code up to several tens of codes (or more), according to the card dimensions, and the size of code characters (font size). The codes may be configured in any wanted form of columns or rows (and may be arranged either from one side or all sides of the card). Preferably, the code list can be designed to be used successively, and the computer of the credit company is programmed such that a non-permitted deviation from the successive order of the codes (there might be also a permitted deviation, all according to the predetermined rules of the credit-card company), disqualifies the whole respective code list. However, according to other embodiments, a non successive use of codes is permitted, provided that they are all of a single list, or more (as will be determined by the credit company).

The supplemental code card can be made of any material, and the codes may be printed or embedded on it in any known method, and in any predetermined configuration.

According to another embodiment, the codes in the card are not covered, however the card is perforated or has a cut near each code, allowing a facile removal or facile marking of used codes, by tearing the relevant perforated portions of the card, in order to prevent double use of codes.

According to one preferred embodiment of the method of the present invention, the codes are coupled in the office of the credit company to specific credit card owners, in advance.

According to other embodiments of the method of the present invention, each code list has its own identification label, and the code lists are distributed to the credit card owners randomly, by mail, stores or other acceptable distribution ways, and their copies in the office are coupled to the record of a specific credit card owner according to a later communication of each owner reporting to the company the label data of a code list to be used.

In order to reduce the memory space needed for storing large scale of code lists (especially when generated in advance for large scale distribution, as hereinbefore said) it is possible to generate the codes by means of a secret computer algorithm such that said identification label of each supplemental-code card is a key for the secret algorithm for generating the list, and such that code lists do not have to be stored in the computer memory (only the key label has to be coupled to the specific owner, wherein each code is computed momentarily for checking the legality of a current remote payment).

BRIEF DESCRIPTION OF THE DRAWINGS

The present invention will be further described by FIGS. 1–4. These figures are solely intend to illustrate some preferred embodiments of the supplemental code card and in no manner intend to limit the scope of the present invention.

DETAILED DESCRIPTION OF THE PREFERRED EMBODIMENTS

Figure 1:
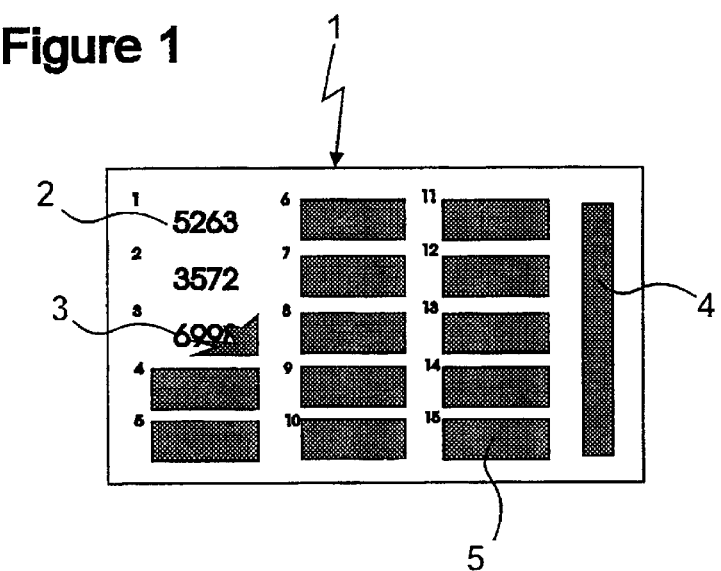
FIG. 1 illustrates a card having codes, each of four digits, covered with a scrathable material.

FIG. 1 illustrates a supplemental code card (1) according to an embodiment of the present invention, having 15 codes arranged in three columns. Each code is of four digits (only for example purpose) and covered with a thin layer of a scratchable printing paint (5). Prior to the execution of each payment, the credit card owner has to scratch and remove the cover of another code, and to report it together with the conventional credit card data.

In this figure, the code (2) and the next one, are already used. The valid code for the current payment (3), is illustrated half scratched. The card has identification number which is also covered (4) with the scratchable material. This number is for reporting to the credit company what card the credit card owner is using. It is helpful in case that the credit company supplies the owner with more than one code card at a time, or in case that the code card is acquired by the user in a store. If no identification is needed (i.e. one code card is supplied to a credit card owner at a time) the identification number is unnecessary, and the code card does not have to include it.

Figure 2:
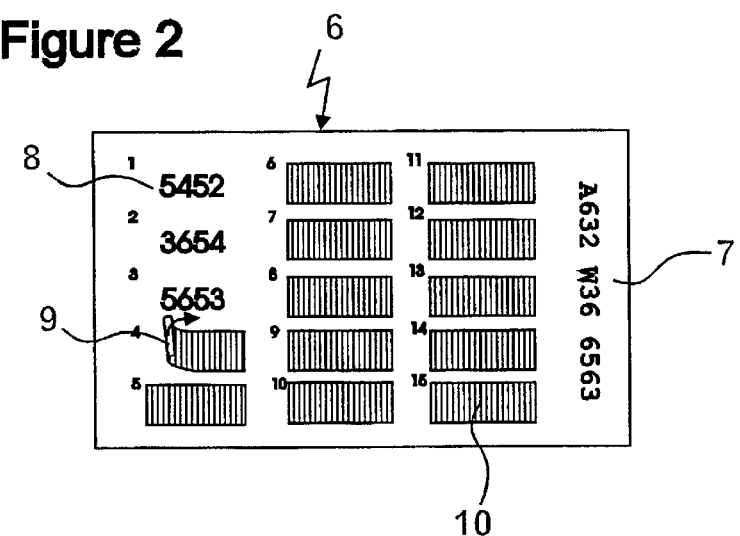
FIG. 2 illustrates a card having codes covered with stickers.

FIG. 2 illustrates a code card (6) having 15 codes, each is covered by a sticker (10). The code (8) and the two next ones, are exposed since they have already been used. The card identification (7) is also exposed. The valid code for the current payment (9) is illustrated during the removal of its sticker, which is seen half separated from the card.

Figure 3:
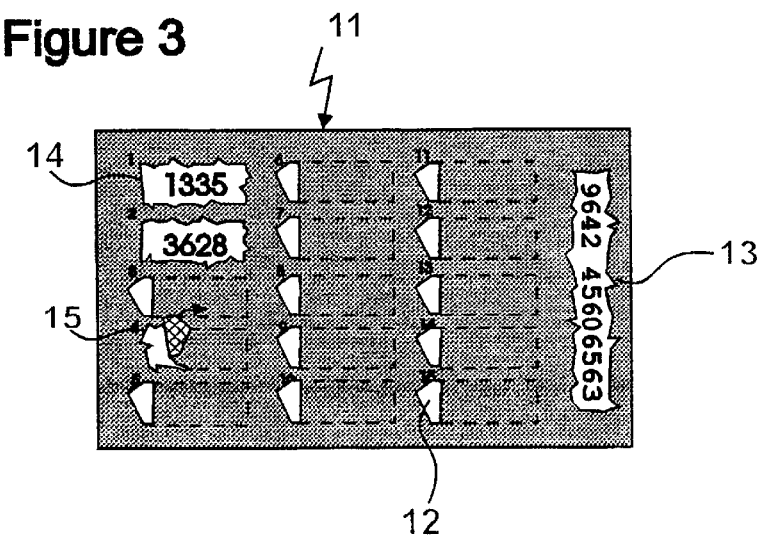
FIG. 3 illustrates a card having codes covered with stickers and a scratchable material, in combination.

FIG. 3 illustrates a code card (11) having 15 codes, each is covered by a combination of both a sticker and a removable layer. The end of the stickers (12) is a tag not covered by the removable layer, thus it can be easily pulled out (15) for removing the sticker. When a sticker is removed, the removable layer is permanently damaged, and the sticker cannot be repaired. Two used codes (14) and the next one, are exposed, and so is the card identification (13).

Figure 4:
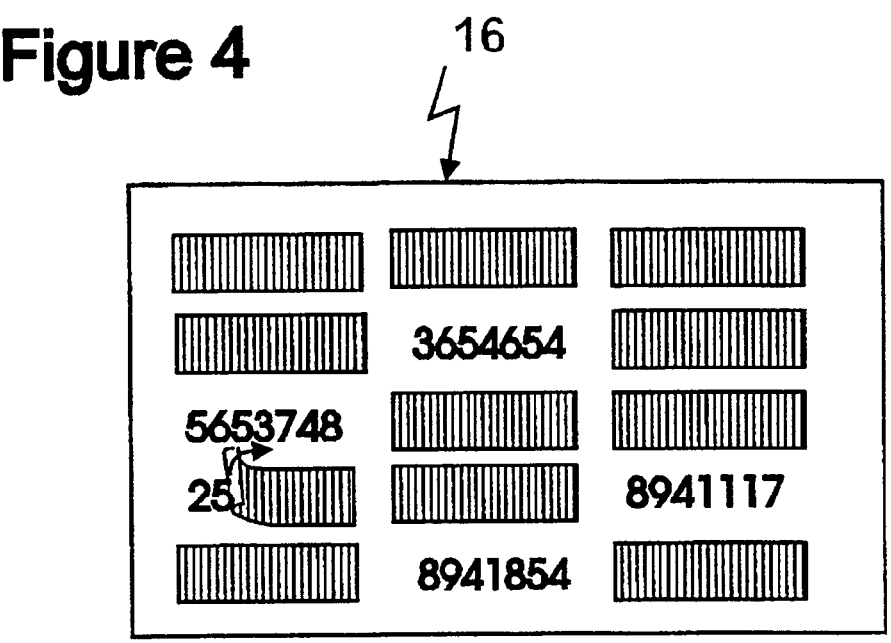
FIG. 4 illustrates a card having codes, each of seven digits, covered with stickers.

FIG. 4 illustrates a card (16) having codes, each of seven digits, covered with stickers. The security given by 7 digits (from the statistical perspective) permits using the codes with no obligation to any predetermined order, thus (differently from the preferred use of the cards of FIGS. 1–3), no serial numbers are printed adjacent to the stickers. A few used codes, which were used randomly without any successive order, are illustrated (those whose stickers are removed).

The performance of a card having four digit codes as may require a successive order in its use, and of a card having seven digit codes as may not require a successive order in its use, is only for a demonstration purposes. The actual requirements are subject to the considerations of the credit company.

This card is illustrated without identification number, as an example for a card supplied directly from the credit company to a specific user, thus registered in the company office on the name of the user, in advance.

It will be apparent to those skilled in the art that various modifications and variations can be made in the various embodiments of the invention without departing from the spirit or scope of the invention. Thus, it is intended that the present invention include modifications and variations that are within the scope of the appended claims and their equivalents.

What is claimed is:

1. A method for preventing unauthorized use of credit cards in transactions involving remote payments comprising the steps of:
   providing a plurality of secret code lists for use with plurality of credit cards, wherein each list is provided by a credit company to an owner of at least one credit card, and each code is for only a single use, and wherein a copy of the code content of each list is assigned in an office of the credit company according to the credit card owner to whom it was provided;
   transmitting a single code from said list to a creditor by the credit card owner for every separate remote payment, together with any required conventional data of the credit card;
   verifying the single code together with the conventional credit card data through a dialogue between the creditor and the credit company, and accepting or rejecting the remote payment, according to a verification result; and
   invalidating the single code used for an accepted remote payment from the code list.

2. A method for preventing unauthorized use of credit cards according to claim 1, further comprising the steps of:
   supplying the code list to the credit card owners through automatic teller machines programmed for producing lists of random codes or for receiving lists of random codes on-line from a computer of the credit company;
   printing the code list on a voucher for the credit card owner; and
   transmitting the code list to the computer of the credit company for assignment according to the credit card owner to whom it was supplied.

3. A method for preventing unauthorized use of credit cards according to claim 2, wherein the automatic teller machines are programmed for offering the credit card owner a selection of customer options.

4. A method for preventing unauthorized use of credit cards according to claim 2, further comprising the steps of:
   detecting a physical valid credit inserted by the credit card owner into the automatic teller machine; and
   verifying the identity of the credit card owner through a secret code typed into the automatic teller machine by the credit card owner.

5. A method for preventing unauthorized use of credit cards according to claim 1, wherein each code list has its own identification label; the code lists are distributed to the credit card owners randomly; and each code list is assigned to a specific credit card owner according to a communication from each credit card owner reporting to the credit card company the label data of a code list to be used.

6. A method for preventing unauthorized use of credit cards according to claim 1, wherein the codes are generated randomly by a computer program.

7. A method for preventing unauthorized use of credit cards according to claim 1, wherein each code is created independently of the transaction for which it is being used.

8. A method for preventing unauthorized use of credit cards according to claim 1, wherein each code is marked by the credit card owner to prevent repeat use of said code.

9. A code card for preventing unauthorized use of credit cards in transactions involving remote payments, wherein the code card comprises a list of codes, wherein each code is usable for a single transaction, and further wherein each code is covered by a removable layer of opaque material for removal by a credit card owner according to a predetermined uncovering progression, prior to performing each remote payment.

10. A code card for preventing unauthorized use of credit cards according to claim 9 wherein the removable layer is scratchable printing material.

11. A code card for preventing unauthorized use of credit cards according to claim 9 wherein the removable layer is a sticker.

12. A code card for preventing unauthorized use of credit cards according to claim 9 wherein the removable layer is a combination of a sticker covered by a scratchable printing material and having free tags for facile removal.

13. A code card for preventing unauthorized use of credit cards according to claim 9, wherein each code is created independently of the transaction for which it is being used.

14. A code card for preventing unauthorized use of credit cards in transactions involving remote payments, wherein the code card comprises a list of codes.

15. A code card for preventing unauthorized use of credit cards according to claim 14, wherein each code is created independently of the transaction for which it is being used.

* * * * *